(12) United States Patent
Wang et al.

(10) Patent No.: US 11,440,751 B2
(45) Date of Patent: Sep. 13, 2022

(54) REACTION VESSEL PICKUP MECHANISM, AUTOMATIC LOADING DEVICE, SAMPLE ANALYZER, AND LOADING METHOD

(71) Applicant: SHENZHEN MINDRAY BIO-MEDICAL ELECTRONICS CO., LTD., Shenzhen (CN)

(72) Inventors: Zhengguo Wang, Shenzhen (CN); Yanwen Weng, Shenzhen (CN); Zhi Zhang, Shenzhen (CN); Changan Wang, Shenzhen (CN); Jun Wang, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 287 days.

(21) Appl. No.: 16/824,586

(22) Filed: Mar. 19, 2020

(65) Prior Publication Data

US 2020/0216273 A1 Jul. 9, 2020

Related U.S. Application Data

(63) Continuation of application No. PCT/CN2017/102532, filed on Sep. 20, 2017.

(51) Int. Cl.
*B65G 47/34* (2006.01)
*B65G 65/00* (2006.01)
*G01N 35/04* (2006.01)

(52) U.S. Cl.
CPC ........... *B65G 65/005* (2013.01); *G01N 35/04* (2013.01)

(58) Field of Classification Search
CPC .. B65G 65/005; B65G 47/1471; B65G 47/38; B65G 47/34; B65G 47/40; B65G 47/42; B65G 47/44; B65G 47/46; B01N 35/04
USPC ....... 198/801, 793, 794, 797, 798, 799, 800, 198/637, 483.1
See application file for complete search history.

(56) References Cited

U.S. PATENT DOCUMENTS

| | | | | |
|---|---|---|---|---|
| 2,390,302 A | * | 12/1945 | Henricksen | F41A 9/05 198/833 |
| 2,391,700 A | * | 12/1945 | Hapman | B65G 19/16 198/716 |
| 2,431,174 A | * | 11/1947 | Henry | B65G 37/02 425/436 RM |
| 5,575,978 A | | 11/1996 | Clark et al. | |

(Continued)

FOREIGN PATENT DOCUMENTS

| | | |
|---|---|---|
| CN | 2601987 Y | 2/2004 |
| CN | 203938091 U | 11/2014 |

(Continued)

OTHER PUBLICATIONS

International Search Report issued in corresponding International Application No. PCT/CN2017/102532, dated Jun. 4, 2018, 5 pages.

*Primary Examiner* — Patrick H Mackey
(74) *Attorney, Agent, or Firm* — Kory D. Christensen

(57) ABSTRACT

A reaction vessel pickup mechanism, an automatic loading device, a sample analyzer, and a loading method are disclosed. Driven by a driving structure, each of the pickup blocks moves in a first preset time or a preset distance and then stops or shakes, so that a reaction vessel is dropped from the pickup blocks more easily.

20 Claims, 10 Drawing Sheets

(56) References Cited

U.S. PATENT DOCUMENTS

| | | | | |
|---|---|---|---|---|
| 8,047,352 B2* | 11/2011 | Yuyama | ............... | B65B 3/003 |
| | | | | 198/607 |
| 8,651,320 B2* | 2/2014 | DuMond | ............ | G07F 17/0092 |
| | | | | 221/217 |
| 8,944,281 B2* | 2/2015 | Inoue | ............... | G07F 17/0092 |
| | | | | 221/172 |

FOREIGN PATENT DOCUMENTS

| | | |
|---|---|---|
| CN | 105398779 A | 3/2016 |
| CN | 105628946 A | 6/2016 |
| CN | 107161643 A | 9/2017 |

\* cited by examiner

REACTION VESSEL PICKUP MECHANISM, AUTOMATIC LOADING DEVICE, SAMPLE ANALYZER, AND LOADING METHOD

CROSS-REFERENCE TO RELATED APPLICATIONS

This application is a bypass continuation of Patent Cooperation Treaty Application No. PCT/CN2017/102532, filed on Sep. 20, 2017, the content thereof is hereby incorporated by reference in its entirety.

TECHNICAL FIELD

The present disclosure relates to a sample analyzer, and in particular to a reaction vessel loading device for a sample analyzer.

BACKGROUND

Disposable reaction vessels may be used for testing in a sample analyzer (for example, a fully automatic chemical luminescence immunity analyzer). During testing, the main effects of a reaction vessel automatic loading device are to automatically orderly arrange scattered reaction vessels added by a user to the device and deliver the arranged reaction vessels to a designated position for use by a testing system.

Generally, the reaction vessel automatic loading device first picks up, by means of a method, a reaction vessel that is scattered in a designated container of an instrument and then conveys the picked reaction vessel to a transport mechanism. A mechanical arm or another device takes the reaction vessel from the transport mechanism for subsequent related operations.

In a conventional reaction vessel automatic loading device, a reaction vessel drops from a pickup mechanism under its own weight. However, when a reaction vessel is stained with a contaminant during delivery or subsequent storage, it may be difficult for the reaction vessel to drop from the pickup mechanism. As a result, the reaction vessel is taken into an instrument, so that other members of the instrument may become abnormal, resulting in an instrument failure.

SUMMARY

The present disclosure provides a novel reaction vessel pickup mechanism and automatic loading device, sample analyzer, and loading method, thereby facilitating the drop of reaction vessels from the pickup mechanism.

According to an aspect of the present disclosure, an embodiment provides a reaction vessel pickup mechanism, which includes:

a driving structure;

a plurality of pickup blocks disposed at intervals on the driving structure, the driving structure driving the pickup blocks to move, each of the pickup blocks having a bearing surface configured to support a reaction vessel, and at least one side of the bearing surface being provided with an opening to form a reaction vessel exit; and a control unit, the control unit being in signal connection with the driving structure, and the control unit sending a control signal that enables the driving structure to drive each of the pickup blocks to pause and/or shake after moving for a first preset period of time or by a preset distance, such that the reaction vessel of the pickup block that moves to an unloading position of the pickup mechanism drops to a transport mechanism through the reaction vessel exit.

According to an aspect of the present disclosure, an embodiment provides a reaction vessel automatic loading device, which includes:

a feed compartment configured to store a reaction vessel;

a pickup mechanism configured to pick up the reaction vessel in the feed compartment;

a control unit configured to control a motion of the pickup mechanism; and a transport mechanism, which includes at least one reaction vessel station configured to store the reaction vessel that drops from the pickup mechanism, so as to store and transport the reaction vessel.

According to an aspect of the present disclosure, an embodiment provides a sample analyzer including the reaction vessel automatic loading device according to any one of the foregoing embodiments and a transfer mechanism, the transfer mechanism configured to transfer the reaction vessel provided by the reaction vessel automatic loading device to a reaction position and/or a position for sample addition.

According to an aspect of the present disclosure, an embodiment provides a loading method for a reaction vessel automatic loading device, and the reaction vessel automatic loading device is the reaction vessel automatic loading device according to any one of the foregoing embodiments; and the reaction vessel automatic loading device includes a plurality of pickup blocks;

the loading method includes:

placing a reaction vessel on one of the pickup blocks; and moving the reaction vessel carried by the pickup block for a first preset period of time or by a preset distance, and then pausing and/or shaking the pickup block to enable the reaction vessel to drop from the pickup block.

By means of the reaction vessel pickup mechanism and automatic loading device, the sample analyzer, and the loading method in the foregoing embodiments, a driving structure drives a pickup block to pause and/or shake after moving for a first preset period of time or by a preset distance, making it easier for reaction vessels to drop from the pickup block drop.

DETAILED DESCRIPTION OF EMBODIMENTS

Figure 1:
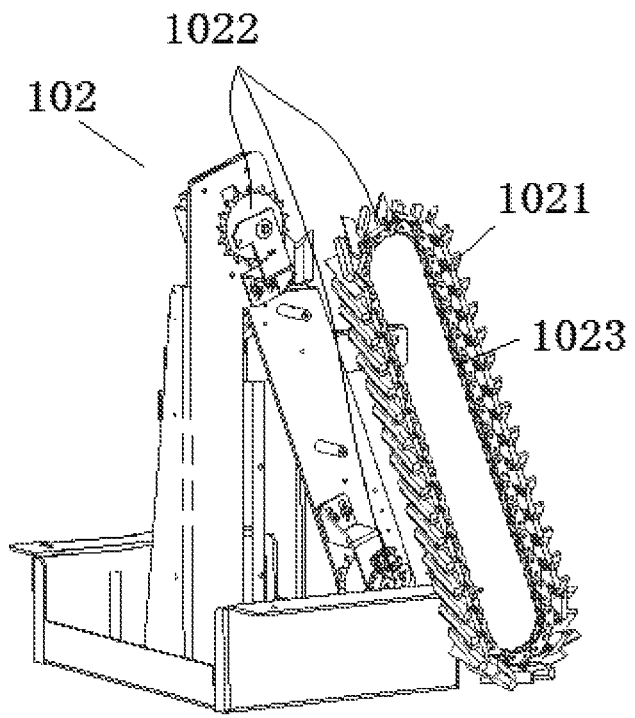
FIG. 1 is an exploded schematic diagram of an embodiment of a reaction vessel pickup mechanism according to the present disclosure.

The disclosure will be further described in detail below in conjunction with the accompanying drawings and specific embodiments. Similar elements in various embodiments use associated similar element reference signs. In the following embodiments, many details are described for the purpose of facilitating better understanding of the present disclosure. However, it would be effortlessly appreciated by those skilled in the art that some features may be omitted or may be substituted by other elements, materials and methods in a different situation. In certain cases, some operations relevant to the present disclosure are not displayed or described in the description, and this is to prevent the core part of the present disclosure from being obscured by too much description. Moreover, for those skilled in the art, describing these relevant operations in detail is not necessary, and they may completely understand relevant operations according to the description and general technical knowledge in the art.

In addition, the characteristics, operations or features described in the description may be combined in any appropriate manner to form various embodiments. Moreover, the steps or actions in the method description may also be changed or adjusted in sequence in a way that would be obvious to those skilled in the art. Therefore, the various sequences in the description and drawings are only for the purpose of clearly describing a certain embodiment and are not meant to be a necessary sequence that must be followed, unless otherwise specified.

The serial numbers themselves for the components herein, for example, "first", "second", etc., are only used to distinguish the described objects, and do not have any sequential or technical meaning. As used in the present disclosure, "connect" or "couple", unless otherwise specified, includes both direct and indirect connections (coupling).

Embodiment 1

Embodiment 1 provides a reaction vessel pickup mechanism 102 used for picking a reaction vessel and conveying the reaction vessel to a preset position for unloading.

Referring to FIG. 1 to FIG. 4, in an embodiment, the reaction vessel pickup mechanism 102 includes a driving structure 1022, a plurality of pickup blocks 1021, and a control unit (not shown in the figure, while the understanding by a person skilled in the art is not affected).

The pickup blocks 1021 are disposed at intervals on the driving structure 1022. The driving structure 1022 drives the pickup blocks 1021 to move. Each of the pickup blocks 1021 has a bearing surface 1021A used for supporting a reaction vessel. At least one side of the bearing surface 1021A is provided with an opening to form a reaction vessel exit 1021H.

The control unit is in signal connection with the driving structure 1022. The control unit sends a control signal that enables the driving structure 1022 to drive each of the pickup blocks 1021 to pause and/or shake after moving for a first preset period of time or by a preset distance, to enable a reaction vessel to drop from the reaction vessel exit 1021H. The reaction vessel may be shown by the reference number 200 in FIG. 14. However, such a reaction vessel 200 is only an example. The pickup mechanism 102 is also applicable to a reaction vessel in another form.

In such a manner of moving forward by the distance and pausing and/or shaking, only the pickup mechanism 102 or only the pickup block 1021 itself shakes. Through the shaking, a reaction container can successfully drop from the reaction vessel exit 1021H of the bearing surface 1021A of the pickup block 1021 to enter a subsequent mechanism.

Figure 2:
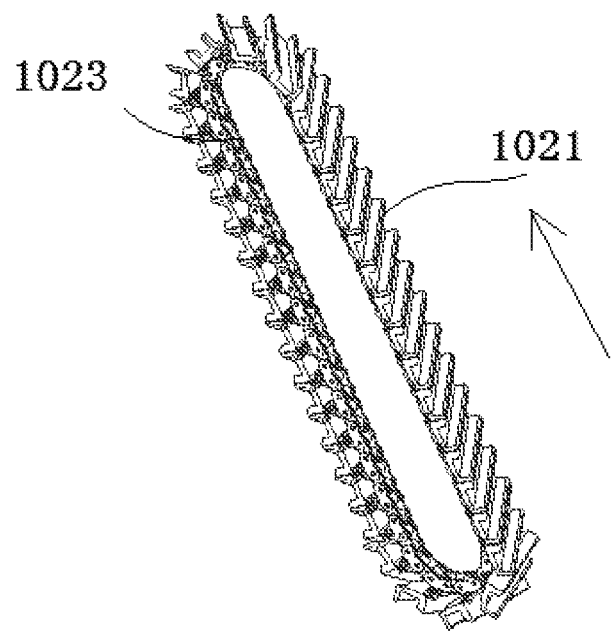
FIG. 2 is a structural schematic diagram of an embodiment of a conveying chain and a pickup block according to the present disclosure.
Figure 3:
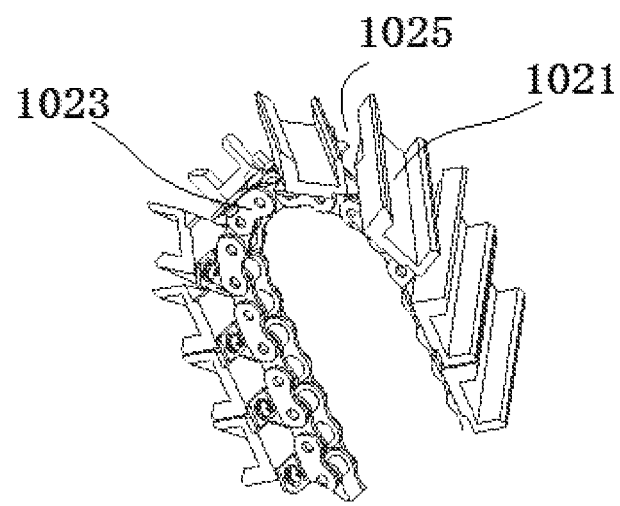
FIG. 3 is a partial enlarged view of FIG. 2.

The preset distance herein is the distance by which each of the pickup blocks 1021 needs to move when each of the pickup blocks 1021 reaches a reaction vessel unloading position. Referring to FIGS. 2 and 3, in an embodiment, the plurality of pickup blocks 1021 are arranged at intervals and move obliquely upward in the direction shown by the arrow in FIG. 2 in a process of conveying reaction vessels. When one current pickup block 1021 is located at an unloading position, the distance between a next pickup block 1021 and the unloading position is equal to a spacing between two adjacent pickup blocks 1021. Therefore, the preset distance may usually be preset to a spacing between two adjacent pickup blocks 1021. In another embodiment, alternatively, the preset distance may be preset to be a positive integer multiple (for example, one time or two times) of a spacing between two adjacent pickup blocks 1021. The movement of the pickup block 1021 within the first preset period of time may be a linear movement, a rotational movement, a curved movement, among others. This is not limited in this embodiment.

Certainly, if the pickup mechanism 102 has a non-fixed unloading position or has a plurality of unloading positions, the preset distance may also be not fixed, but instead preset according to the distance between the position of the pickup block 1021 and an unloading position each period of time. The first preset period of time herein is a period of time for the pickup block 1021 to move by the preset distance.

The pickup block 1021 pauses and/or shakes after moving for the first preset period of time or by the preset distance to enable a reaction vessel to be unloaded at a designated position, to prevent the reaction vessel from dropping at another position to cause a machine failure.

Further, the pickup block 1021 pauses and/or shakes for a second preset period of time after moving by the first preset distance or for the first preset period of time.

The pause is that the pickup block 1021 is kept still within the second preset period of time after moving by the preset distance or for the first preset period of time, so that the sudden pause of the pickup block 1021 is used for enabling a reaction vessel to move relative to the pickup block 1021 under the inertia to facilitate the drop of the reaction vessel from the pickup block 1021.

The shaking comprises at least one of the following three manners: making the pickup blocks 1021 separately move backward and forward at least once within the second preset period of time, making the pickup blocks 1021 move backward by the distance within the second preset period of time, or making the pickup blocks 1021 intermittently move forward or backward by at least two distances within the second preset period of time.

The separately moving backward and forward at least once within the second preset period of time is that the pickup blocks 1021 to move backward and forward repeatedly to form shaking. The forward direction is the same as the direction in which the pickup blocks 1021 conveys a reaction vessel, and the backward direction opposite the forward direction.

That the pickup blocks 1021 moves backward by the distance within the second preset period of time refers to enabling the pickup block 1021 to reverse by the distance when the pickup block almost reaches the unloading position. The opposite movement enables a reaction vessel to drop from the pickup block 1021.

The intermittently moving forward or backward by at least two distances within the second preset period of time is that the pickup blocks 1021 first move forward or backward by the distance, pauses, and then continues to move in the same direction, so as to use stepped pause and movement to form shaking.

The foregoing three manners are only three embodiments of implementing shaking. In practice, the shaking may be implemented in other manners. The manners are not enumerated herein.

The driving structure 1022 is usually used for implementing the pause and shaking of the pickup blocks 1021. For example, in an embodiment, the driving structure 1022 comprises an electric motor and a synchronous belt or a conveying chain driven by the electric motor. The pickup blocks 1021 is fixedly mounted on the synchronous belt or the conveying chain. In this case, the start and stop states and the forward rotation and reverse rotation of the electric motor may be used to implement the pause and shake of the pickup blocks 1021.

The driving structure 1022 may use another power device such as a gas cylinder or a hydraulic cylinder. In this case, the operation directions, start and stop states, and the like of such a power device may be changed for implementing the pause and shaking of the pickup blocks 1021.

In addition to implementing shaking by using the driving structure 1022, a mechanical structure may be alternatively used for implementing shaking. For example, one shaking mechanism is disposed at the unloading position of the pickup mechanism 102, so that when the pickup block 1021 moves to the unloading position, the shaking mechanism applies a force to the pickup block 1021 to enable the pickup block shake.

In another aspect, in an embodiment, the each of the pickup blocks 1021 moves in a cyclic motion. Within one cycle of motion, each of the the pickup block 1021 first moves for the first preset period of time or by the preset distance and then pauses and/or shakes for the second preset period of time. As shown in FIG. 1 to FIG. 4, each of the pickup blocks 1021 pauses or shakes once after each step of each of the picking block on the conveyor chain.

Figure 5:
FIG. 5 is a schematic diagram of a cycle of motion of a pickup block.

Referring to FIG. 5, each of T1 and T2 represents one cycle of motion of each of the pickup blocks 1021. Each cycle at least comprises two periods of time t1 and t2, where t1 represents the first preset period of time, and t2 represents the second preset period of time. The each of the pickup block 1021 first moves for the first preset period of time t1, and then pauses and/or shakes for the second preset period of time t2.

Certainly, in some embodiments, each of the pickup block 1021 may further complete other motions within one cycle of motion. The other motions may take place within any period of time within one cycle of motion.

To make it easy for a reaction vessel to slide, in some embodiments, the bearing surface 1021A may be obliquely disposed. The reaction vessel exit 1021H located on a lower side of the oblique bearing surface 1021A. In this way, a reaction vessel can easily drop from the bearing surface 1021A.

Referring to FIG. 1 to FIG. 4, an embodiment provides a specific implementation manner of the pickup mechanism 102. The pickup mechanism 102 comprises a driving structure 1022 and a plurality of pickup blocks 1021 disposed at intervals on the driving structure 1022. Each of the pickup block 1021 is used for picking a reaction vessel from a feed compartment used for storing scattered reaction vessels during movement.

Each of the 1021 comprises a bearing surface 1021A used for supporting a reaction vessel, and a stop plate 1021B disposed opposite the bearing surface 1021A, and a connecting body 1021C connecting the bearing surface 1021A and the stop plate 1021B. The bearing surface 1021A, the connecting body 1021C, and the stop plate 1021B may be integrally molded. Alternatively, the bearing surface 1021A, the connecting body 1021C, and the stop plate 1021B that are separate may be fixed together.

Figure 4:
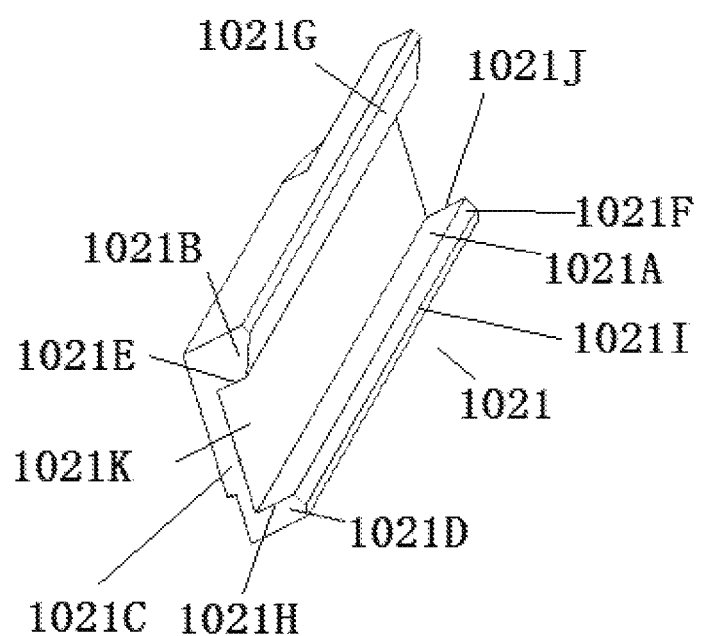
FIG. 4 is a structural schematic diagram of an embodiment of a pickup block according to the present disclosure.

Referring to FIG. 4, the bearing surface 1021A may be one or more surfaces of a bearing body 1021D. The bearing body 1021D may be a plate-shaped body or may have any other shape.

The bearing surface 1021A, the connecting body 1021C, and the stop plate 1021B form an accommodating trough/groove 1021K used for accommodating a reaction vessel. The entire accommodating trough 1021K is disposed obliquely downward and has a reaction vessel exit 1021H used for a reaction vessel to drop, to enable the reaction vessel to slide from the accommodating trough 1021K by gravity. The reaction vessel exit 1021H is usually located on a lower side of the accommodating trough 1021K. The accommodating trough 1021K further has a reaction vessel entrance. The reaction vessel entrance may be preferably disposed obliquely upward or disposed partially obliquely upward, to enable a reaction vessel to drop into the accommodating trough 1021K through the reaction vessel entrance by gravity. A reaction vessel usually randomly drops into the accommodating trough 1021K. For the pickup block 1021 shown in FIG. 4, the reaction vessel entrance of the accommodating trough 1021K comprises the reaction vessel exit 1021H (which used as both the entrance and exit), an opening 1021J in one side opposite the reaction vessel exit 1021H, and an opening 1021I in one side opposite the connecting body 1021C. A reaction vessel randomly enters the accommodating trough 1021K through these openings. In addition to using the reaction vessel exit 1021H also as a part of the reaction vessel entrance, in another embodiment, the reaction vessel entrance and the reaction vessel exit of the accommodating trough 1021K may be disposed separately.

Certainly, both the cases in which the entire accommodating trough 1021K is disposed obliquely downward and the reaction vessel entrance of the accommodating trough 1021K is disposed obliquely upward herein apply to a process in which the pickup block 1021 picks and conveys a reaction vessel (that is, the section shown by the arrow in FIG. 2 in which the pickup block 1021 moves upward).

To prevent one accommodating trough 1021K from picking and storing two or more reaction vessels at the same period of time, in a preferred manner, the width and length of the accommodating trough 1021K are preset to be slightly larger than those of a reaction vessel. That is, only one reaction vessel can be accommodated. Generally, the accommodating trough 1021K is horizontally disposed. That is, the shape of the accommodating trough matches the shape of the reaction vessel lying, that the reaction vessel is accommodated lying in the accommodating trough 1021K. However, in some embodiments, the reaction vessel may be placed vertically in the pickup block 1021 for conveying.

As shown in FIG. 3, a gap 1025 is provided between adjacent pickup blocks 1021. When the pickup block 1021 carries a reaction vessel (the reaction vessel fails to drop from the unloading position for some reason) that is not unloaded and continues to move upward to a corner of a conveying chain 1023, the gap 1025 between the adjacent pickup blocks 1021 becomes larger. In this case, the facing direction of the pickup block 1021 is changed. Without the stop by the stop plate 1021B, the reaction vessel is very likely to drop into the gap 1025 between the two adjacent pickup blocks 1021, and eventually the pickup mechanism 102 gets stuck. In this embodiment, with the presence of the stop plate 1021B, a reaction vessel that not unloaded can only continue to remain in the accommodating trough 1021K or drop through the opening 10211, the reaction vessel exit 1021H or the opening 1021J of the accommodating trough 1021K, but is prevented from dropping into the gap 1025 between the adjacent pickup blocks 1021. Therefore, the problem that the pickup mechanism 102 gets stuck is solved.

Referring to FIG. 4, the stop plate 1021B has an upper stop surface 1021E opposite the bearing surface 1021A. At least one of the bearing surface 1021A or the upper stop surface 1021E has a chamfer 1021F, 1021G that is disposed outward from the accommodating trough 1021K and is used for increasing the size of an opening of the reaction vessel entrance to provide a reaction vessel with a larger entrance to make it easier to collect the reaction vessel. In addition, because of such a special pickup structure, when one pickup block 1021 passes obliquely upward through a feed compartment 101, several reaction vessels may be stacked in one accommodating trough 1021K. In this case, compared with a common sharp corner transition, the chamfer may further provide guidance, making it easier for the first reaction vessel to accurately drop into the accommodating trough 1021K. After the first reaction vessel drops into the accommodating trough 1021K, other reaction vessels drop from the pickup blocks 1021 more easily because of the insufficient remaining space in the accommodating trough 1021K and the presence of the chamfer instead of being hung on a trough wall of the accommodating trough 1021K.

Figure 14:
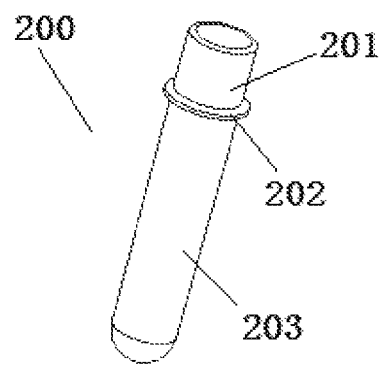
FIG. 14 is a schematic diagram of an embodiment of a reaction vessel according to the present disclosure.

In an embodiment, referring to FIG. 14, a reaction vessel 200 has a ridge 202 used as a hanging portion. The sectional size of the ridge (when the cross section of the ridge is circular, the sectional size is a circular diameter formed by an outermost edge) is d. The sectional size of a portion 203 below the hanging portion of the reaction vessel 200 is f (when the cross section of the portion 203 below the hanging portion of the reaction vessel 200 is circular, the sectional size is a circular diameter formed by an outermost edge), the range of a chamfer a of a bearing surface is selected as:

$$0.5(d-f) \leq a \leq 2(d-f).$$

The range of a chamfer b of the upper stop surface is selected as:

$$0.5f \leq b \leq 2f.$$

Figure 6:
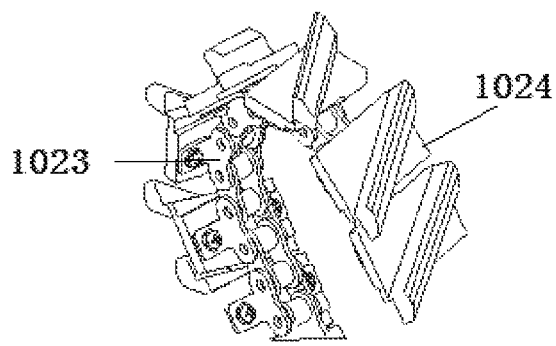
FIG. 6 is a structural schematic diagram of another embodiment of a conveying chain and a pickup block according to the present disclosure.
Figure 7:
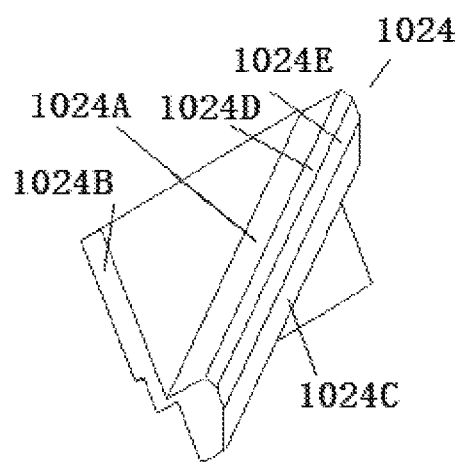
FIG. 7 is a structural schematic diagram of another embodiment of a pickup block according to the present disclosure.

In another aspect, this embodiment further provides another pickup mechanism. Referring to FIGS. 6 and 7, in an embodiment, the driving structure comprises an electric motor (not separately shown in the figure, while the understanding of this by a person skilled in the art is not affected) and the conveying chain 1023. The conveying chain 1023 and a conveying wheel thereof are generally disposed obliquely, and the conveying chain 1023 forms a conveying track that works in a cyclic motion. The plurality of pickup blocks 1024 are disposed on the conveying chain 1023 at intervals of a particular distance and are therefore driven by the conveying chain 1023 to obliquely convey reaction vessels upward in a cyclic motion.

The each of the pickup blocks 1024 has a bearing surface 1024A used for supporting a reaction vessel. The driving structure controls each of the pickup blocks 1024, to enable the bearing surface 1024A of each of the pickup blocks 1024 to obliquely pass upward through the feed compartment, to pick, convey, and unload a reaction vessel.

The bearing surface 1024A is disposed obliquely, and a reaction vessel exit 1021H is formed on a lower side of the bearing surface. This manner is generally equivalent to the foregoing pickup block 1021 with the stop plate 1021B omitted.

Referring to FIGS. 1, 6, and 7, in this embodiment, each of the pickup blocks 1024 further comprises a connecting body 1024B in addition to the bearing surface 1024A. The connecting body 1024B is mounted on the driving structure 1022.

To expand the space for a reaction vessel to enter the bearing surface 1024A, each of the pickup blocks 1024 has a bearing surface 1024A used for supporting a reaction vessel and a lower bottom surface 1024C located on the opposite surface of the bearing surface 1024A. At least one of the bearing surface 1024A or the lower bottom surface 1024C has a chamfer 1024D, 1024E used for increasing the probability that a reaction vessel enters the bearing surface 1024A.

In an embodiment, the range of a chamfer a (consistent with the chamfer of the bearing surface 1021A shown above) of the bearing surface 1024A is selected as:

$$0.5(d-f) \leq a \leq 2(d-f).$$

In an embodiment, the range of a chamfer c of the lower bottom surface 1024C selected as:

$$0.5f \leq c \leq 2f.$$

The chamfer of the lower bottom surface 1024C is used for fitting the bearing to surface 1024A of a next pickup block 1024 to form a relatively large opening for a reaction vessel to enter the bearing surface 1024A.

Compared with a common sharp corner transition, this chamfer design may further provide guidance, making it easier for the first reaction vessel to accurately drop onto the bearing surface 1024A. After the first reaction vessel drops onto the bearing surface 1024A, other reaction vessels drop from the pickup blocks 1024 more easily because of the insufficient remaining space in the bearing surface 1024A and the presence of the chamfer instead of being hung on a trough wall of the bearing surface 1024A.

Figure 8:
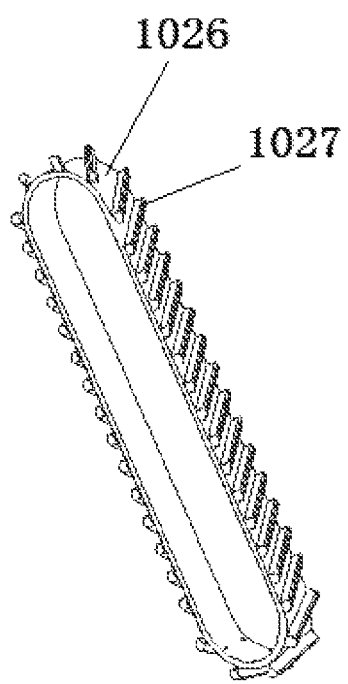
FIG. 8 is a structural schematic diagram of an embodiment of a synchronous belt and a pickup block according to the present disclosure.

Further, the pickup mechanism 102 may be alternatively another structure. Referring to FIG. 8, in an embodiment, the driving structure comprises an electric motor (not separately shown in the figure, while the understanding of this by a person skilled in the art is not affected) and a synchronous belt 1026. The synchronous belt 1026 and a conveying wheel thereof are generally disposed obliquely, and the synchronous belt 1026 forms a conveying track that works in a cyclic motion. The plurality of pickup blocks 1027 are disposed on the synchronous belt 1026 at intervals of a particular distance and are therefore driven by the synchronous belt 1026 to obliquely deliver reaction vessels in a cyclic motion upward.

The benefit of using the synchronous belt 1026 lies in that the gap 1025 in the conveying chain 1023 (as shown in FIG. 3) is not formed between the pickup blocks 1027, so that a reaction vessel can be prevented from getting stuck in the gap 1025.

Figure 9:
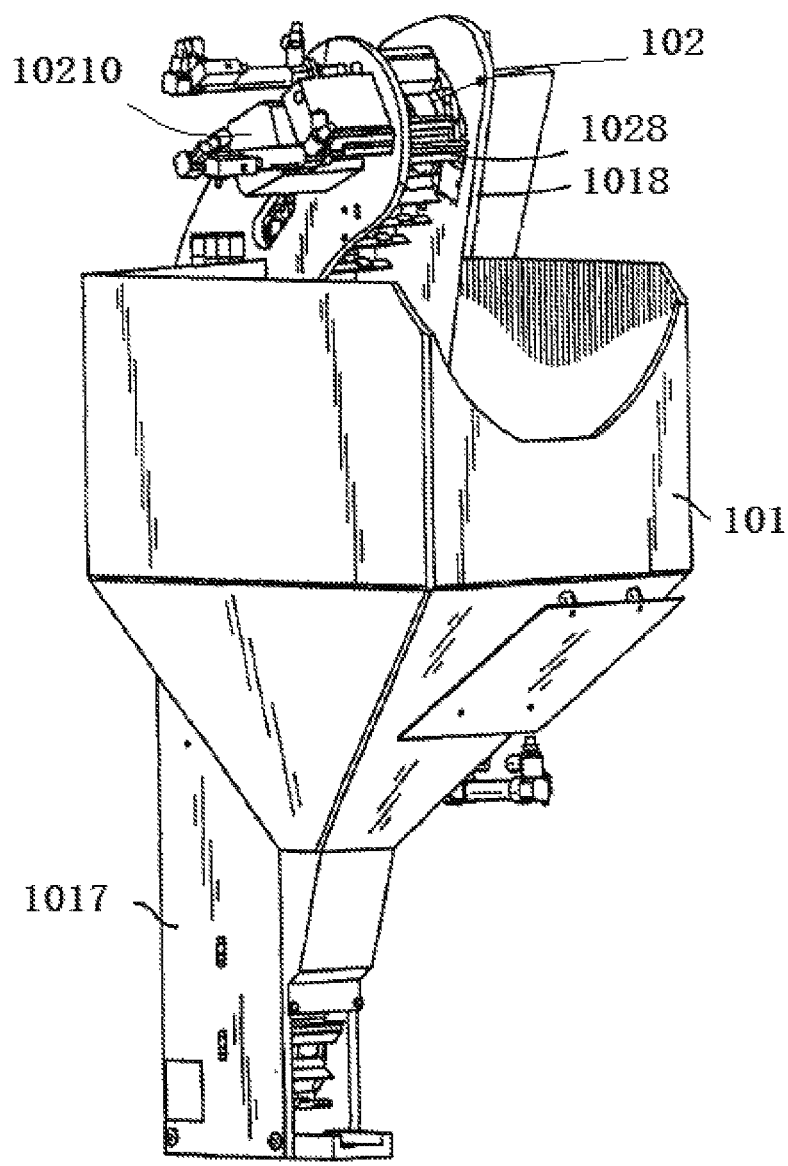
FIGS. 9 and 10 are structural schematic diagrams of another embodiment of a conveying chain and a pickup block according to the present disclosure.
Figure 10:
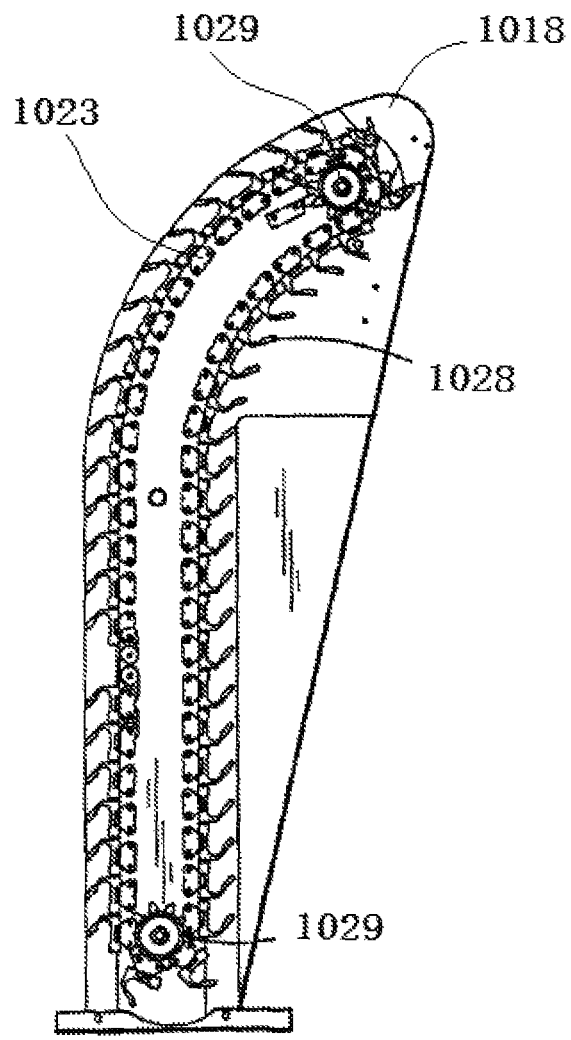

In another aspect, referring to FIGS. 9 and 10, in an embodiment of another pickup mechanism, the pickup mechanism 102 fits one feed compartment 101. The feed compartment 101 is mounted on one frame structure or mounted at a position near the frame structure. The frame structure is a frame structure that comprises a left side plate 1017 and a right side plate 1018.

Next, referring to FIGS. 9 and 10, the pickup mechanism 102 comprises a pickup block 1028, a conveying chain 1023, a conveying wheel 1029, and a drive electric motor 10210. The pickup block 1028 is mounted at the conveying chain 1023, and the pickup block 1028 has one bearing surface or accommodating trough used for accommodating a reaction vessel. The conveying chain 1023 is driven by the conveying wheel 1029 mounted between the left side plate 1017 and the right side plate 1018. The conveying wheel 1029 is then driven by the drive electric motor 10210 mounted on the left side plate 1017.

The feed compartment 101 has an oblique bottom surface used for conveying reaction vessels to a gathering area located at the bottom of the feed compartment 101. The gathering area at the bottom of the feed compartment 101 may be, for example, approximately 4 inches high to enable a reaction vessel to drop the bearing surface of the pickup block 1028. A door area is provided below the gathering area of the feed compartment 101 to prevent a reaction vessel from dropping from the device when the reaction vessel passes between the pickup block 1028 and the feed compartment 101.

Each pickup blocks 1028 has a convex edge on each side, so that the convex edge carried in a corresponding trough in the left side plate 1017 and the right side plate 1018 guides an object along a specific path. The conveying chain 1023 and the pickup block 1028 form one cyclic loop that may be, for example, approximately 48 inches long. An idler is mounted between the left side plate 1017 and the right side plate 1018 and is located at the bottom of the conveying chain 1023, to guide the conveying chain 1023 and the pickup block 1028.

The pickup blocks 1028 lift reaction vessels from the feed compartment 101 and stir reaction vessels accommodated in the feed compartment 101. The pickup blocks 1028 are designed with the largest retaining area, so as to maximize the possibility that each of the pickup blocks 1028 captures one reaction vessel in the bearing surface or the accommodating trough of the pickup block 1028. An extra reaction vessel in the pickup block 1028 easily drops back into the feed compartment.

When the pickup block 1028 approaches the conveying wheel 1029, an extra reaction vessel slides out from the pickup block 1028 and falls back into the feed compartment 101, and only one reaction vessel remains in the bearing surface or the accommodating trough of each pickup block 1028. Most reaction vessels that drop from the pickup blocks 1028 and return into the feed compartment 101 are parallel to each other and are generally parallel to the pickup block 1028, thereby increasing the possibility that the reaction vessels enter the gathering area of reaction vessels of the feed compartment 101.

Embodiment 1 shows several pickup mechanisms. These mechanisms control the motion strokes of pickup blocks, to enable the pickup blocks to operate in a manner of taking one step and stopping once or taking one step and shaking once, that with this pause or shaking, reaction vessels drop more easily from the pickup blocks.

Embodiment 2

Embodiment 2 provides a reaction vessel automatic loading device that can automatically load reaction vessels and eventually arrange disorderly reaction vessels in a particular order, to facilitate fetching in subsequent operations.

Figure 11:
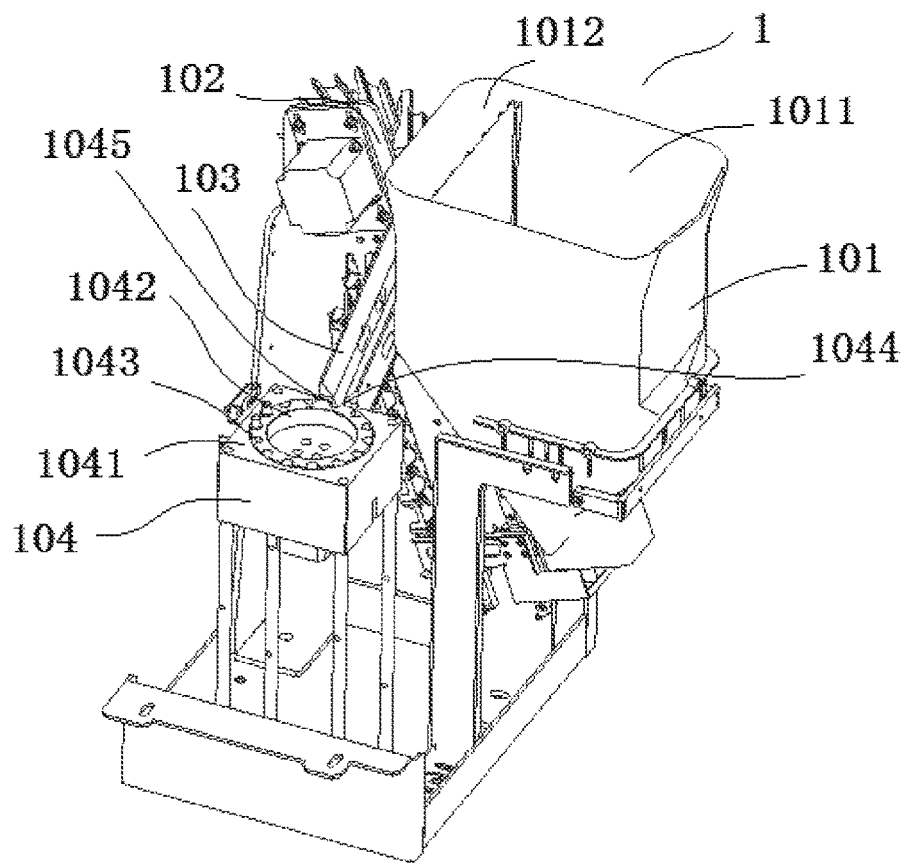
FIG. 11 is a structural schematic diagram of an embodiment of a reaction vessel automatic loading device according to the present disclosure.
Figure 12:
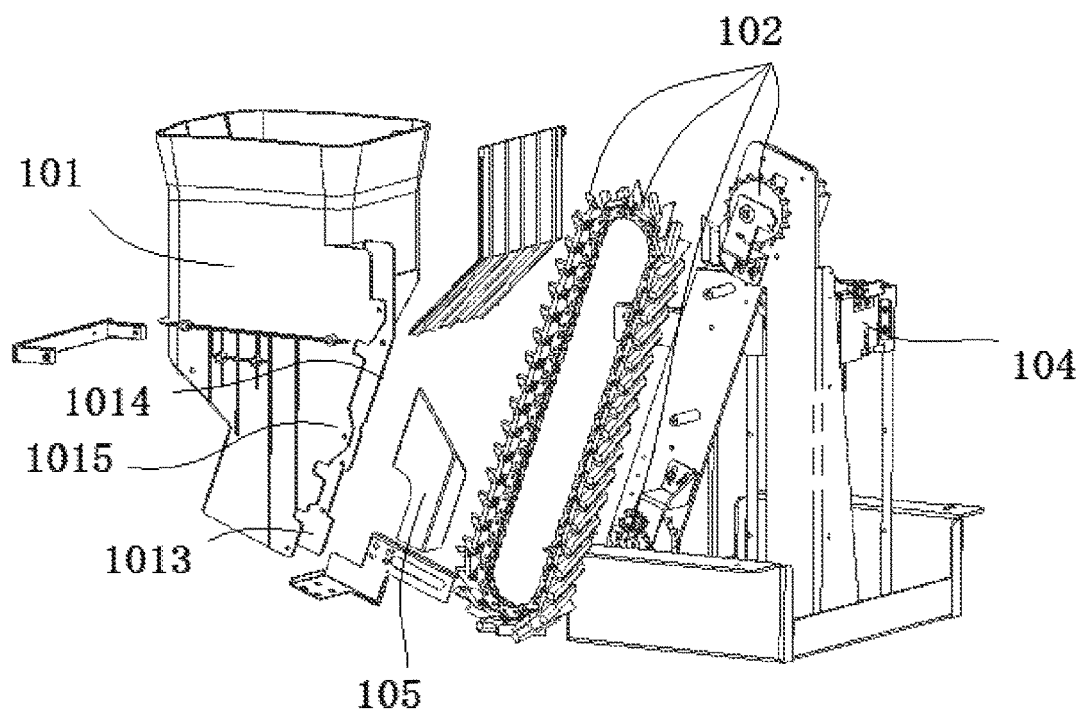
FIG. 12 is an exploded view of the embodiment shown in FIG. 11.

Referring to FIGS. 11 and 12, in an embodiment, a reaction vessel automatic loading device 1 comprises a feed compartment 101, a pickup mechanism 102, a reversing mechanism 103, a transport mechanism 104, and a control unit (not shown in the figure). The control unit is used for controlling the motion of the pickup mechanism. In addition, the control unit may also be used for controlling other mechanisms such as the reversing mechanism 103, the transport mechanism 104, and the like.

The pickup mechanism 102 may be any of the pickup mechanisms shown in embodiment 1 or another pickup mechanism, so that the pausing or shaking in this operation manner of making a pickup block move forward by the distance and pause and/or shake once is used for making it easier for a reaction vessel to drop from the pickup block.

The pickup mechanism 102 shown in FIG. 1 to FIG. 4 is used as example for description below in this embodiment.

Next, referring to FIGS. 11 and 12, the feed compartment 101 is used for storing disorderly reaction vessels and has one accommodating cavity. The accommodating cavity has a flared opening. The flared opening makes it convenient for an operator to add scattered reaction vessels to the accommodating cavity. The flared opening may be provided with an openable cover to keep the flared opening in a sealed state when no reaction vessel is added. The feed compartment 101 may have a shape with the size decreasing from top to bottom. The flared opening is disposed at the upper portion, so that the flared opening is large enough for the operator to conveniently add reaction vessels.

The driving structure 1022 controls the pickup block 1021, to enable the accommodating trough 1021K of the pickup block 1021 to obliquely pass upward through the feed compartment 101 during a stroke, to pick, convey, and unload a reaction vessel. Specifically, as shown in FIG. 1, FIGS. 11 and 12, one side of the feed compartment 101 may be provided with an inclined opening 1013. After a part of the pickup mechanism 102 is placed in the inclined opening 1013 to enter the feed compartment 101, the reaction vessel entrance on the accommodating trough 1021K of the pickup block 1021 faces the inside of the feed compartment 101 and is disposed obliquely upward, to make it easy for a reaction vessel to drop into the accommodating trough 1021K. After being mounted in the inclined opening 1013, the driving structure 1022 and the pickup block 1021 basically seal the inclined opening 1013 or have a relatively small interval from the opening wall of the inclined opening 1013, so that a reaction vessel is prevented from dropping out of the feed compartment 101 through the inclined opening 1013.

Referring to FIG. 1, FIGS. 4 and 11, in an embodiment, the feed compartment 101 is divided by a middle partition into a large cavity and a small cavity. A large cavity 1011 is used for adding and storing new reaction vessels. A small cavity 1012 an effective picking area. The large cavity 1011 and the small cavity 1012 are in communication at the bottom. As reaction vessels in the small cavity 1012 are gradually removed, reaction vessels in the large cavity 1011 gradually enter the small cavity 1012. A part of the pickup mechanism 102 extends obliquely upward from the small cavity 1012, so that the pickup blocks 1021 are driven by the driving structure 1022 to sequentially pass through the small cavity 1012 and move obliquely upward, so that a reaction vessel in the small cavity 1012 drops onto the bearing surface 1021A of the pickup block 1021 under the effect of gravity and nearby reaction vessels and move along with the pickup blocks 1021, so as to complete picking of the reaction vessel.

With the two cavities with different sizes, too many reaction vessels can be prevented from stacking in the small cavity 1012, so that it is ensured that the pickup blocks 1021 can adequately pick reaction vessels. Certainly, instead of being limited to such a manner of a large cavity and a small cavity, the feed compartment 101 may be a complete cavity or designed in another manner.

Referring to FIGS. 3 and 12, the driving structure 1022 comprises an electric motor (not separately shown in the figure, while the understanding of this by a person skilled in the art is not affected) and the conveying chain 1023. The conveying chain 1023 and a conveying wheel thereof are generally disposed obliquely, and the conveying chain 1023 forms a conveying track that works in a cyclic motion. The plurality of pickup blocks 1021 are disposed on the conveying chain 1023 at intervals of a particular distance and are therefore driven by the conveying chain 1023 to obliquely deliver reaction vessels in a cyclic motion upward.

Referring to FIGS. 2, 4, 11 and 12, in an embodiment, the feed compartment 101 has a side plate 1014 disposed along a movement trajectory of the pickup block 1021. One side (a lower side of the accommodating trough 1021K), sealing the reaction vessel exit of the pickup block 1021, of the side plate 1014 is used for preventing a reaction vessel 200 from dropping out of the bearing surface 1021A. The side plate 1014 does not extend to the highest position (that is, the corner of the conveying chain 1023) of the conveying chain 1023 on one side. A reaction vessel on the pickup block 1021 can drop into a conveying trough 1031 only after crossing the highest edge of the side plate 1014.

In addition, an opposite second side plate 1015 may be disposed on the other side of the side plate 1014. The side plate 1014 and the second side plate are respectively located on two sides of the conveying chain 1023 to limit and protect two sides of the pickup block 1021.

Figure 13:
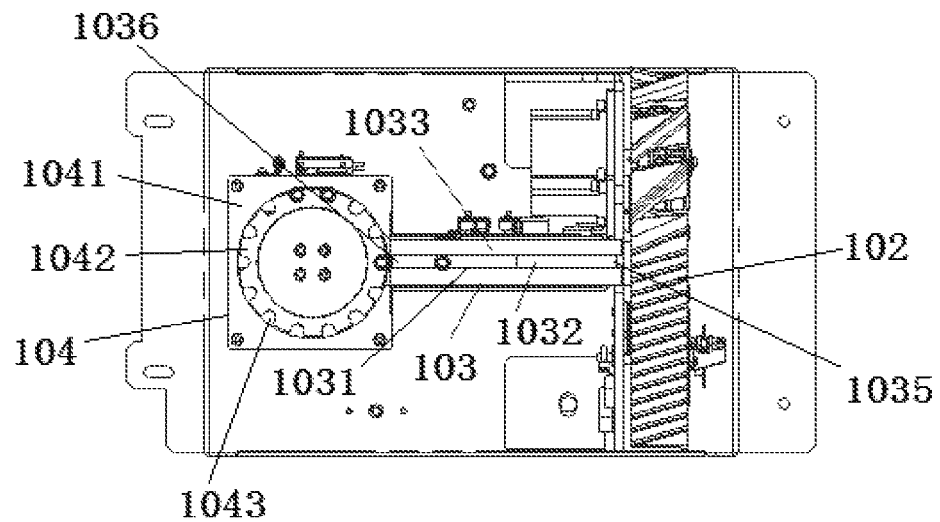
FIG. 13 is a top view of an embodiment of a reaction vessel automatic loading device according to the present disclosure.

Further, the reversing mechanism 103 implements a collection and arrangement process, so that reaction vessels picked by the pickup mechanism 102 can be sequentially arranged in order. Referring to FIG. 13, a reaction vessel entrance 1035 of the reversing mechanism 103 is located at the reaction vessel exit 1021H of the pickup mechanism 102. A reaction vessel slides from the pickup block 1021 to enter the reversing mechanism 103.

An angle is preset between a direction in which the reversing mechanism 103 conveys a reaction vessel 200 and a direction in which the pickup mechanism 102 conveys the reaction vessel 200 to change a conveying direction of the reaction vessel 200 to facilitate cooperation with a subsequent structure. Certainly, in another embodiment, the reversing mechanism and the pickup mechanism may be disposed in the same direction or opposite directions.

Next, referring to FIG. 13, the reversing mechanism 103 is disposed on one side of the pickup mechanism 102 and is used for receiving and conveying a reaction vessel that drops from the pickup block 1021. The transport mechanism 104 is located at a reaction vessel exit 1036 of the reversing mechanism 103.

Figure 15:
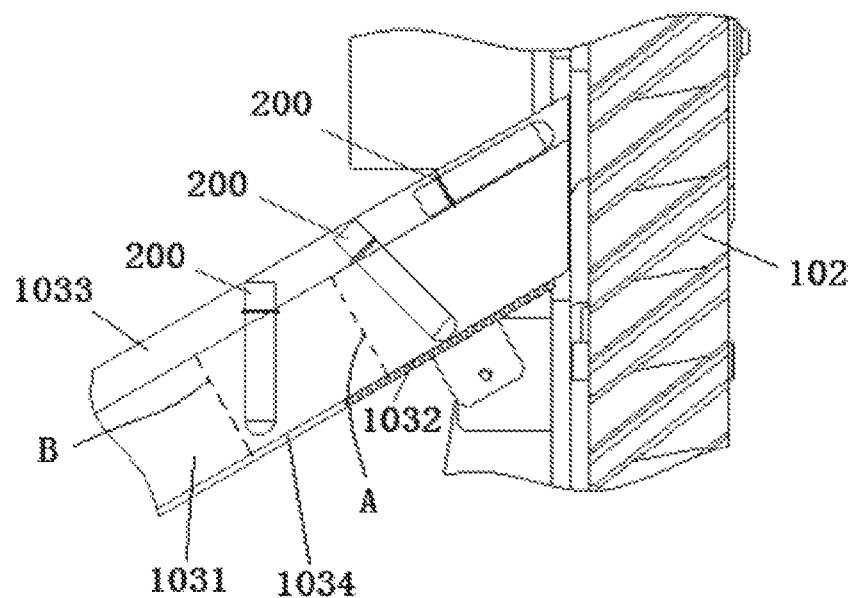
FIG. 15 is a schematic diagram of an embodiment of a conveying trough according to the present disclosure.

Specifically, next, referring to FIGS. 13 and 15, in an embodiment, after the reversing mechanism 103 is engaged to the pickup mechanism 102, the reversing mechanism 103 has the conveying trough 1031 that is disposed obliquely downward from one side of the pickup mechanism 102. The conveying trough 1031 has a size that allows the lower portion of a reaction vessel 200 to enter, and the width of the conveying trough 1031 is less than the width of a hanging portion on the reaction vessel 200. Therefore, when the reaction vessel 200 drops into the conveying trough 1031, the hanging portion of the reaction vessel 200 may be hung on a trough wall of the conveying trough 1031, and the portion below the hanging portion of the reaction vessel 200 enters the conveying trough 1031 to enable the reaction vessel 200 to slide in the conveying trough 1031 by the hanging portion.

Referring to FIG. 14, the reaction vessel 200 used in this embodiment comprises a tube body 201 and a ridge 202 disposed outside the tube body 201. In such a reaction vessel 200, the ridge 202 is equivalent to the hanging portion of the reaction vessel 200. The portion below the hanging portion of the reaction vessel 200 is 203. The reaction vessel 200 is mainly hung on an upper edge of the conveying trough 1031 by using the ridge 202. Certainly, in another embodiment, the hanging portion may be a structure in another form, for example, may be a plurality of convex blocks. In some embodiments in which the tube body 201 is disposed to be conical, the hanging portion may even be the outer wall of the tube body 201, so that the smaller end of the tube body 201 enters the conveying trough 1031, and the larger end is hung outside the conveying trough 1031.

Referring to FIG. 15, when a reaction vessel 200 drops into the conveying trough 1031, the reaction vessel 200 spins while sliding due to its own weight. The reaction vessel 200 spins to keep the opening of the reaction vessel 200 facing upward to complete the redirection of the reaction vessel 200. However, the reaction vessel 200 generally swings in the conveying trough 1031 with the hanging portion being the center in the early stage after dropping into the conveying trough 1031. For example, FIG. 15 shows that the reaction vessel 200 enters the conveying trough 1031 with the bottom facing right. In this case, the portion 203 below the hanging portion of the reaction vessel 200 swings downward in a clockwise direction. Similarly, when the reaction vessel 200 enters the conveying trough 1031 with the bottom facing left, in this case, the portion 203 below the hanging portion of the reaction vessel 200 swings downward in a counterclockwise direction. Once such swing is excessively big, the reaction vessel 200 may slide out of or drop from the conveying trough 1031, resulting in other unpredictable failures.

For this, in this embodiment, at least one end, near the pickup mechanism 102, of the conveying trough 1031 is provided with a first trough bottom wall 1032. the distance (a vertical distance, shown by the dotted line A in FIG. 15) between the first trough bottom wall 1032 and the upper edge of the conveying trough 1031 is less than the distance between the lowermost portion of the reaction vessel 200 and the hanging portion. Therefore, the reaction vessel 200 is stopped by the first trough bottom wall 1032 when swinging to a particular angle, as shown in FIG. 15, so that the reaction vessel is prevented from swinging excessively large to slide out of or drop from the conveying trough 1031. In addition, when the reaction vessel 200 enters the conveying trough 1031 in a manner with the bottom facing right, the first trough bottom wall 1032 may further help reduce the speed of the reaction vessel 200, thereby preventing the reaction vessel from rapidly sliding downward in the conveying trough 1031.

Next, referring to FIG. 15, in an embodiment, the bottom of the conveying trough 1031 is provided with a hollow portion 1034 located behind the first trough bottom wall 1032. The hollow portion 1034 is that the portion does not have a bottom wall or an opening is provided in the bottom wall. The hollow portion enables the lower portion of the reaction vessel 200 to freely drop in the conveying trough 1031 and then sequentially slide downward.

In another embodiment, the bottom of the conveying trough 1031 is provided with a second trough bottom wall (not shown) located behind the first trough bottom wall 1032. The distance (a vertical distance, as shown by the dotted line B in FIG. 15) between the second trough bottom wall and the upper edge of the conveying trough 1031 is greater than the distance between the lowermost portion of the reaction vessel 200 and the hanging portion. The second trough bottom wall enables the lower portion of the reaction vessel 200 to freely drop in the conveying trough 1031 and then sequentially slides downward.

Certainly, in some other embodiments, the conveying trough 1031 may have both the hollow portion 1034 and the second trough bottom wall discussed above. In addition, in some embodiments, the entire conveying trough 1031 may have the foregoing first trough bottom wall 1032.

Further, referring to FIGS. 11 and 15, in an embodiment, the reversing mechanism 103 has an approximately V-shaped guide trough 1033. The bottom of the guide trough 1033 is coupled to the conveying trough 1031 and is disposed extending in the same direction as the conveying trough 1031. The guide trough 1033 is used for increasing the receiving range of the conveying trough 1031. In this way, even if the position at which a reaction vessel 200 drops on the pickup block 1021 is not accurate enough, the reaction vessel may still drop into the guide trough 1033 and slide into the conveying trough 1031 along the guiding surface of the guide trough 1033.

In another aspect, the conveying trough 1031 has a sliding area near the pickup mechanism 102 and a temporary storage area used for temporarily storing a reaction vessel 200, and the temporary storage area is engaged behind the sliding area, to enable the reaction vessel 200 to enter the temporary storage area from the sliding area for lineup and temporary storage. The temporary storage area is usually disposed at an end of the conveying trough 1031. In this case, reaction vessels 200 are sequentially arranged and temporarily stored in the conveying trough 1031. The sliding area may be considered as an area from the starting end (an end near the reaction vessel exit of the pickup mechanism 102) of the conveying trough 1031 to the temporary storage area.

A storage status detection unit is disposed in the temporary storage area and is used for detecting whether reaction vessels in the temporary storage area 200 arranged to a preset position or whether a quantity of the reaction vessels reaches a preset quantity. The storage status detection unit is in signal connection with the control unit and is used for feeding back a storage status of the temporary storage area to the control unit. The control unit may determine, according to the received storage status, whether to continue to pick up a reaction vessel 200 and whether to prompt a user. For example, when it is detected that the temporary storage area is filled with reaction vessels 200, the pickup mechanism 102 is controlled to stop picking a reaction vessel 200, and at the same period of time the user may be informed that the temporary storage area is already filled with reaction vessels 200.

Further, a reaction vessel detection unit is disposed in the sliding area. The reaction vessel 200 detection unit is in signal connection with the control unit and is used for detecting whether a reaction vessel 200 has moved from the sliding area to the temporary storage area. The control unit may determine, according to the detection result of the reaction vessel 200 detection unit, whether reaction vessels 200 need to be added to the feed compartment 101. If no reaction vessel 200 moves from the sliding area to the temporary storage area for a long period of time, and within this period of time the pickup mechanism 102 still keeps working, it may be determined that the reaction vessels 200 in the feed compartment 101 are not enough to be picked by the pickup mechanism 102 and reaction vessels 200 need to be added, so as to prompt the user to add reaction vessels.

At least one of the storage status detection unit or the reaction vessel 200 detection unit is a photoelectric sensor. To detect whether the feed compartment is filled with reaction vessels 200, a photoelectric sensor may be disposed in the temporary storage area or at a joint between the temporary storage area and the sliding area, the photoelectric sensor only needs to detect whether a reaction vessel 200 is always present at the position within a particular period of time. Generally, the first trough bottom wall 1032 may be located in the sliding area to ensure that a reaction vessel 200 in the temporary storage area is hung in the conveying trough 1031 in a free drop state. The temporary storage area is disposed in an area corresponding to the second trough bottom wall or the hollow portion 1034, to enable the reaction vessel 200 to enter a line for temporary storage in a free drop state.

In another aspect, referring to FIGS. 11 and 13, the transport mechanism 104 is engaged at the reaction vessel exit 1036 of the conveying trough 1031. The transport mechanism 104 has at least one reaction vessel station 1043 used for storing a reaction vessel 200 to place and transport the reaction vessel 200.

In this embodiment, the transport mechanism 104 is a transport tray used for transporting orderly arranged reaction vessels 200 and positioning the reaction vessels at designated positions in the system. During the rotation of the transport tray, a reaction vessel 200 in the reversing mechanism 103 enters the reaction vessel station 1043 of the transport tray, and the transport tray rotates to transport the reaction vessel 200 to a designated position in the system.

In an embodiment, the transport mechanism 104 keeps rotating in one direction, and the transport mechanism 104 is provided with a plurality of reaction vessel stations 1043. After one of the reaction vessel stations 1043 receives a reaction vessel, the transport mechanism 104 rotates by one stroke to enable a next reaction vessel station 1043 to move to the reaction vessel exit 1036 of the conveying trough 1031. In this case, the transport mechanism 104 waits for the reaction vessel 200 to enter the reaction vessel station 1043 and then rotates by another stroke, to enable a further next reaction vessel station 1043 to be aligned with the reaction vessel exit 1036 of the conveying trough 1031, and the cyclic rotation is performed in this movement manner.

Referring to FIGS. 11 and 13, in an embodiment, the transport mechanism 104 comprises a mounting base 1041 and a rotating tray 1042. The rotating tray 1042 has at least one reaction vessel station 1043. One side of the reaction vessel station 1043 is provided with an opening to form an internal vessel inlet 1045. The rotating tray 1042 is rotatably disposed in the mounting base 1041. The rotating tray 1042 may be driven by the electric motor or another driving structure. The rotating tray 1042 is a round disk structure. The mounting base 1041 forms a cylindrical cavity, so that after the rotating tray 1042 is mounted in the cavity, the mounting base 1041 surrounds the rotating tray 1042. One side of the mounting base 1041 is provided with an opening to form an outer vessel inlet 1044. The outer vessel inlet 1044 is engaged with the reaction vessel exit (for example, an exit of the conveying trough 1031) of the reversing mechanism 103. The internal vessel inlet 1045 is disposed on one side (an outer side of the rotating tray 1042), near the mounting base 1041, of the rotating tray 1042, to enable the internal vessel inlet 1045 to be aligned with the outer vessel inlet 1044 during rotation for a reaction vessel 200 to enter the reaction vessel station 1043.

The rotating tray 1042 is mounted on a transport electric motor (not shown in the figure). The control unit is connected to the transport electric motor and is used for controlling the rotation of the transport electric motor, so as to control the rotation of the rotating tray 1042.

The transport electric motor may be out of step during working. To prevent the problem that during the operation of the rotating tray 1042, an out-of-step failure directly leads to that the module stops operation, in an embodiment, a method of self-restoration from an out-of-step failure is provided.

Figure 16:
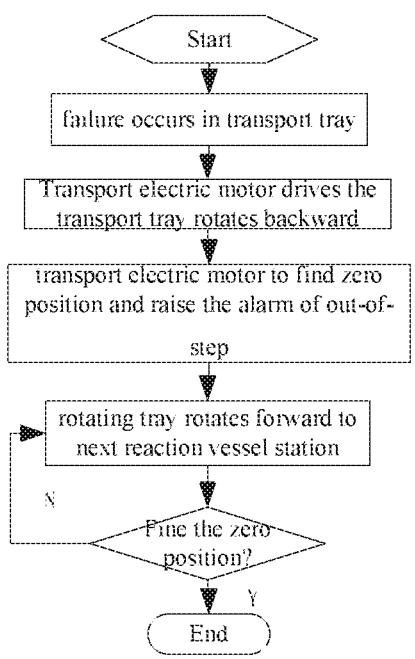
FIG. 16 is a flowchart of a self-restoration method of a transport mechanism according to an embodiment of the present disclosure.

Referring to FIG. 16, after a transport electric motor out-of-step signal is detected, the control unit drives the transport electric motor to rotate backward by the preset distance and then rotate forward, the control unit at the same period of time controls the transport electric motor to start to find a zero position as the transport electric motor rotates forward.

After a signal indicating that a zero position is found is received, the control unit controls the transport electric motor to normally rotate.

After a signal indicating that a zero position fails to be found is received, the control unit controls the transport electric motor to stop operation and sends prompt information. An operator manually intervenes according to the prompt information to perform maintenance and repair.

Certainly, after the control unit detects that the transport electric motor is out of step, an out-of-step alarm may be raised to prompt the operator.

In an embodiment, in the process of finding a zero position, the transport electric motor may rotate forward to a next vessel position and determine whether the zero position is found. If the zero position is found, the self-restoration process ended, and rotation becomes normal. For example, if the zero position is not found, the transport electric motor continues to rotate to a next vessel position to continue to find a zero position. When a zero position fails to be found several period of times, the control unit then controls the transport electric motor to stop operation and sends the prompt information.

An automatic loading device that comprises both the reversing mechanism 103 and the transport mechanism 104 is described above. In another embodiment, the reversing mechanism 103 may be omitted, and the transport mechanism 104 directly acquires a reaction vessel 200 that drops from the pickup mechanism 102 and performs transporting. In addition, the transport mechanism 104 and the reversing mechanism 103 may be integrated into one structure, so that both the function of the reversing mechanism 103 and the function of the transport mechanism 104 are provided.

Referring to FIG. 12, in an embodiment, a stirring mechanism is further comprised. The stirring mechanism has a stirring block 105. The stirring block 105 mounted in the feed compartment 101 and is used for stirring reaction vessels 200 and enabling the reaction vessels 200 to enter the bearing surface 1021A, thereby improving the picking efficiency of the pickup mechanism 102.

The stirring block 105 may be driven by a separate power source. The stirring block 105 may be controlled by using a power source of the pickup mechanism 102. For example, the stirring block 105 is driven by a driven shaft of the conveying chain 1023. During the movement of the pickup mechanism 102, the stirring block 105 moves both up and down and in another direction. The stirring block 105 may have a movement trajectory that is approximately the same as the movement direction of the bearing surface 1021A or a vertical upward movement trajectory. For example, the stirring block 105 may be disposed along the pickup mechanism 102, and the movement trajectory of the stirring block may be parallel to a movement direction corresponding to the pickup block 1021. The stirring block is used for pushing up stacked reaction vessels 200 to enable the reaction vessels 200 to drop onto the pickup block 1021 during the drop.

No interval is preferably formed between the stirring block 105 and each of the pickup mechanism 102 and the feed compartment 101. If an interval is formed, the interval has a size that can prevent a reaction vessel 200 from dropping, to prevent a reaction vessel 200 from dropping into the interval, thereby preventing the machine from getting stuck.

Embodiment 3

Embodiment 3 provides a sample analyzer, comprising a reaction vessel automatic loading device and a transfer mechanism. The reaction vessel automatic loading device is used for providing a reaction vessel. The transfer mechanism is used for moving the reaction vessel provided by the reaction vessel automatic loading device to another position. In some embodiments, the transfer mechanism may be a mechanical arm or another mechanism having a transfer function.

The other position may be a position in a reaction device. The reaction device may be one reaction disk. The reaction device is used for providing one or more vessel positions for placing reaction vessels; and the other position may be alternatively a sample addition position separately disposed from the reaction disk. The mechanical arm conveys the reaction vessel to the sample addition position to perform a sample addition operation.

The reaction vessel automatic loading device is any of the reaction vessel automatic loading devices shown in the foregoing embodiment 2. Alternatively, any of the reaction vessel pickup mechanisms shown in the foregoing embodiment 1 is used for picking a reaction vessel.

Embodiment 4

Embodiment 4 provides a loading method for a reaction vessel automatic loading device.

Figure 17:
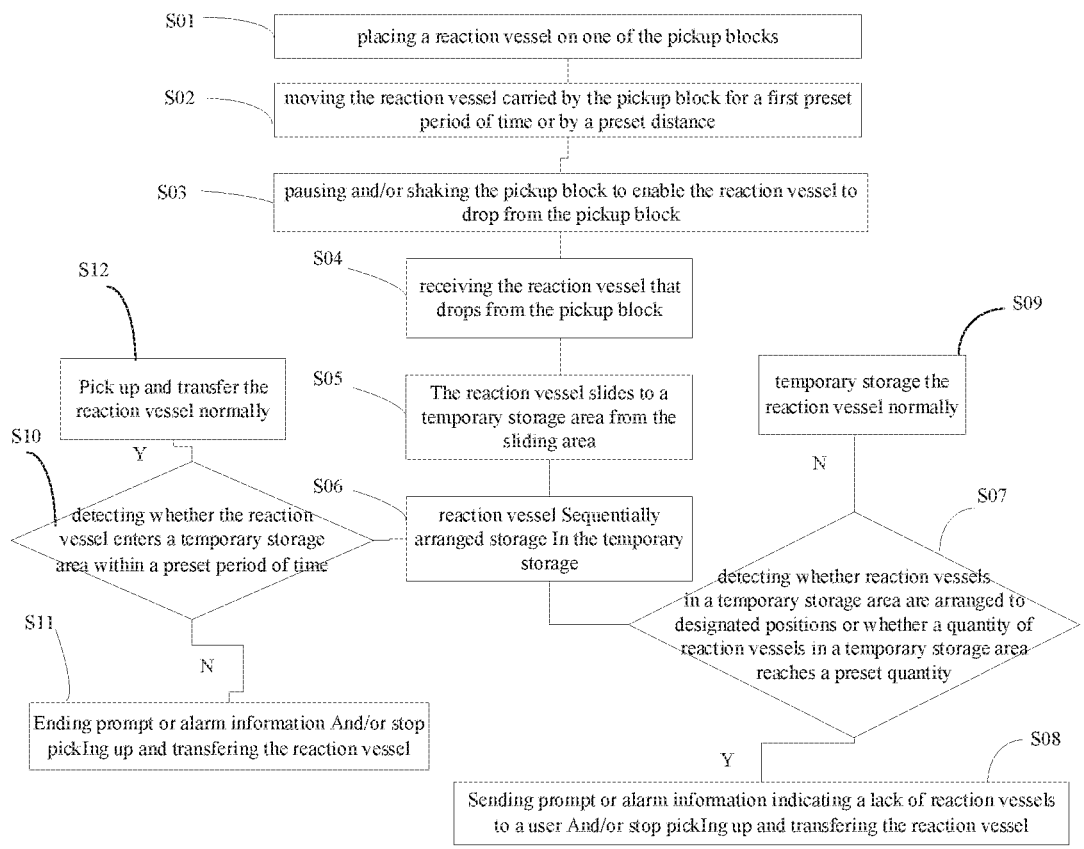
FIG. 17 is a block flowchart of an embodiment of a loading method according to the present disclosure.

The reaction vessel automatic loading device is, for example, any of the reaction vessel automatic loading devices shown in embodiment 2; and referring to FIG. 17, the loading method comprises:

a picking step, comprising:

S01: a reaction vessel on one of the pickup blocks; and a conveying step comprising:

S02: conveying, by the pickup block, the reaction vessel to move according to a preset path by a preset distance or for a first preset period of time; and S03: making the pickup block pause and/or shake, to enable the reaction vessel on the pickup block to drop.

the step of making the pickup block pause and/or shake can be realized by means of the structure as shown in embodiments 1 and 2.

Referring to FIG. 17, in some embodiments, the loading method further comprise:

a temporary storage step, comprising:

S06: sequentially arranging the reaction vessel that drops from the pickup block in a temporary storage area for temporary storage.

Further, referring to FIG. 17, in some embodiments, the loading method further comprises:

a first detection step, comprising:

S07: detecting whether reaction vessels in the temporary storage area are arranged to a designated position or whether a quantity of the reaction vessels reaches a preset quantity; and when the detection result is positive, the loading method comprises:

S08: sending prompt or alarm information to a user and/or stopping the picking step and the conveying step.

When the detection result is negative, the loading method comprises:

S09: normally performing the temporary storage step, and the picking step and the conveying step are normally performed.

Further, referring to FIG. 17, in some embodiments, before the temporary storage step, the loading method further comprises:

transporting step comprising

S04: receiving the reaction vessel that drops in the conveying step; and

S05: making the reaction vessel slide from a receiving position to the temporary storage area.

In step S05, the reaction vessel may slide downward on a track disposed obliquely downward. The reaction vessel first slides on the track to the temporary storage area in a non-free drop state with the bottom of the reaction vessel turning toward the start point of the track, or the reaction vessel slides in the non-free drop state by the preset distance and then restores a free drop state to slide to the temporary storage area.

Specific operations may be shown in FIG. 15. A reaction vessel 200 slides downward on the track that is disposed obliquely downward. The reaction vessel 200 first slides on the track by the preset distance in a non-free drop state with the bottom of the reaction vessel turning toward the start point of the track, so as to prevent speed reduction and prevent the reaction vessel 200 from spinning excessively large (as discussed in embodiment 2).

Further, referring to FIG. 17, in some embodiments, the loading method further comprises:

a second detection step, comprising:

S10: detecting whether a reaction vessel enters the temporary storage area within a preset period of time and whether the picking step and the conveying step are stopped; and when the detection result is that no reaction vessel enters the temporary storage area and the picking step and the conveying step are not stopped, the loading method comprises:

S11: sending prompt or alarm information indicating a lack of reaction vessels to a user and/or stopping the picking step and the conveying step.

When the detection result is that a reaction vessel enters the temporary storage area, the loading method comprises:

S12: normally performing the picking step and the conveying step.

Further, in the conveying step in some embodiments, the pickup block moves in a cyclic motion. As shown in embodiment 1, within one cycle of motion, the pickup block first moves for the first preset period of time or by the preset distance and then pauses and/or shakes for a second preset period of time.

Further, in the conveying step in some embodiments, the shaking comprises at least one of the following three manners: making the pickup block separately move backward and forward at least once within the second preset period of time, making the pickup block move backward by the distance within the second preset period of time, or making the pickup block intermittently move forward or backward by at least two distances within the second preset period of time. For the explanations of three manners, refer to the content in embodiment 1.

Further, in the conveying step in some embodiments, the preset distance is a positive integer multiple of a spacing between two adjacent pickup blocks. The first preset period of time is a period of time for the pickup block to move by the preset distance.

The disclosure has been described with reference to specific examples, which are merely for the purpose of facilitating understanding of the disclosure and are not intended to limit the disclosure. It will be apparent to those skilled in the art that changes may be made to the specific embodiments described above in accordance with the teachings of the disclosure.

What is claimed is:

1. A reaction vessel pickup mechanism, comprising:
   a driving structure;
   a plurality of pickup blocks disposed at intervals on the driving structure, the driving structure driving the pickup blocks to move, each of the pickup blocks having a bearing surface configured to support a reaction vessel, and at least one side of the bearing surface being provided with an opening to form a reaction vessel exit; and
   a control unit, the control unit being in signal connection with the driving structure, and the control unit sending a control signal that enables the driving structure to drive each of the pickup blocks to pause and/or shake after moving for a first preset period of time or by a preset distance, such that the reaction vessel of the pickup block that moves to an unloading position of the pickup mechanism drops to a transport mechanism through the reaction vessel exit,
   wherein the bearing surface is obliquely disposed, and the reaction vessel exit is located on a lower side of the oblique bearing surface.

2. The reaction vessel pickup mechanism of claim 1, further comprising a shaking mechanism, wherein the shaking mechanism is disposed at the unloading position of the pickup mechanism, when one of the pickup blocks moves to the unloading position, the shaking mechanism is capable of shaking the pickup block to drive the reaction vessel to drop from the reaction vessel exit.

3. The reaction vessel pickup mechanism of claim 1, wherein the preset distance is a positive integer multiple of a spacing between two adjacent pickup blocks, and the first preset period of time is a period of time for each pickup block to move by the preset distance.

4. A reaction vessel pickup mechanism, comprising:
a driving structure;
a plurality of pickup blocks disposed at intervals on the driving structure, the driving structure driving the pickup blocks to move, each of the pickup blocks having a bearing surface configured to support a reaction vessel, and at least one side of the bearing surface being provided with an opening to form a reaction vessel exit; and
a control unit, the control unit being in signal connection with the driving structure, and the control unit sending a control signal that enables the driving structure to drive each of the pickup blocks to pause and/or shake after moving for a first preset period of time or by a preset distance, such that the reaction vessel of the pickup block that moves to an unloading position of the pickup mechanism drops to a transport mechanism through the reaction vessel exit,
wherein each of the pickup blocks moves in a cyclic motion, and within one cycle of motion, each of the pickup blocks first moves for the first preset period of time or by the preset distance and then pauses or shakes for a second preset period of time,
wherein the driving structure is capable of:
driving the pickup blocks to move backward and forward at least once within the second preset period of time;
driving the pickup blocks to move backward by a distance within the second preset period of time; or
driving the pickup blocks to intermittently move forward or backward by at least two distances within the second preset period of time.

5. A reaction vessel pickup mechanism, comprising:
a driving structure;
a plurality of pickup blocks disposed at intervals on the driving structure, the driving structure driving the pickup blocks to move, each of the pickup blocks having a bearing surface configured to support a reaction vessel, and at least one side of the bearing surface being provided with an opening to form a reaction vessel exit; and
a control unit, the control unit being in signal connection with the driving structure, and the control unit sending a control signal that enables the driving structure to drive each of the pickup blocks to pause and/or shake after moving for a first preset period of time or by a preset distance, such that the reaction vessel of the pickup block that moves to an unloading position of the pickup mechanism drops to a transport mechanism through the reaction vessel exit,
wherein the driving structure comprises: an electric motor, and a synchronous belt or a conveying chain driven by the electric motor; each of the pickup blocks is fixedly mounted on the synchronous belt or the conveying chain, and the synchronous belt or the conveying chain is obliquely disposed, to enable the bearing surface of each of the pickup blocks to pick up a reaction vessel that is stored in a feed compartment as the synchronous belt or the conveying chain moves through the feed compartment.

6. A reaction vessel automatic loading device, comprising:
a feed compartment configured to store a reaction vessel;
a pickup mechanism configured to pick up the reaction vessel in the feed compartment;
a control unit configured to control a motion of the pickup mechanism;
a transport mechanism, the transport mechanism comprising at least one reaction vessel station configured to store the reaction vessel that drops from the pickup mechanism, so as to store and transport the reaction vessel; and
a reversing mechanism, wherein the reversing mechanism is configured to receive the reaction vessel that drops from the pickup mechanism, adjust a facing direction of the reaction vessel and then convey the reaction vessel to the transport mechanism, an outer vessel inlet of the transport mechanism receives the reaction vessel from a reaction vessel exit of the reversing mechanism.

7. The reaction vessel automatic loading device of claim 6, wherein the reversing mechanism comprises a conveying trough disposed obliquely downward from one side of the pickup mechanism, the conveying trough has a sliding area adjacent to the pickup mechanism and a temporary storage area configured to temporarily store the reaction vessel, and the temporary storage area is located behind the sliding area, to enable the reaction vessel to enter the temporary storage area from the sliding area.

8. The reaction vessel automatic loading device of claim 7, wherein the pickup mechanism comprises:
a driving structure;
a plurality of pickup blocks disposed at intervals on the driving structure, the driving structure driving the pickup blocks to move, each of the pickup blocks having a bearing surface configured to support a reaction vessel, and at least one side of the bearing surface being provided with an opening to form a reaction vessel exit; and
the control unit being in signal connection with the driving structure, and the control unit sending a control signal that enables the driving structure to drive each of the pickup blocks to pause or shake after moving for a first preset period of time or by a preset distance, such that the reaction vessel of the pickup block that moves to an unloading position of the pickup mechanism drops to the transport mechanism through the reaction vessel exit of the bearing surface.

9. The reaction vessel automatic loading device of claim 8, further comprising a storage status detection unit or a reaction vessel detection unit, wherein,
the storage status detection unit is disposed at the temporary storage area and is configured to detect whether reaction vessels in the temporary storage area are arranged to preset positions or whether a quantity of reaction vessels in the temporary storage area reaches a preset quantity, and the storage status detection unit is connected with the control unit, the control unit is further configured to stop a motion of the driving structure after receiving a full storage signal sent by the storage status detection unit;
the reaction vessel detection unit is disposed at the sliding area, and the reaction vessel detection unit is configured to detect whether a reaction vessel has moved from the sliding area to the temporary storage area, and the reaction vessel detection unit is connected with the control unit.

10. The reaction vessel automatic loading device of claim 8, wherein each pickup block further comprises:
a stop plate, disposed opposite the bearing surface, and
a connecting body, connecting the bearing surface and the stop plate;
the bearing surface, the connecting body, and the stop plate form an accommodating trough configured to accommodate the reaction vessel, the accommodating trough is disposed obliquely, and the driving structure drives the pickup blocks, to enable the bearing surface of each pickup block to obliquely move through the feed compartment to pick up the reaction vessel.

11. The reaction vessel automatic loading device of claim 7, wherein the conveying trough has a size that allows a portion below a hanging portion of the reaction vessel to pass through, and a width of the conveying trough is less than a width of the hanging portion of the reaction vessel; and an end of the conveying trough, near the pickup mechanism, is provided with a first trough bottom wall, and a distance between the first trough bottom wall and an upper edge of the conveying trough is less than a distance between a lowermost portion and the hanging portion of the reaction vessel to limit a rotating angle of the reaction vessel at the conveying trough.

12. The reaction vessel automatic loading device of claim 11, wherein a bottom of the conveying trough is provided with at least one of a hollow portion or a second trough bottom wall located behind the first trough bottom wall, a distance between the second trough bottom wall and the upper edge of the conveying trough is greater than the distance between the lowermost portion and the hanging portion of the reaction vessel, and the second trough bottom wall and the hollow portion enable a lower portion of the reaction vessel to freely drop in the conveying trough.

13. The reaction vessel automatic loading device of claim 7, wherein the reversing mechanism further comprises an approximately V-shaped guide trough, and a bottom of the guide trough is coupled to the conveying trough and is extending along a same direction as the conveying trough.

14. A sample analyzer, comprising the reaction vessel automatic loading device of claim 6 and a transfer mechanism configured to transfer the reaction vessel provided by the reaction vessel automatic loading device to a reaction position or a position for sample addition.

15. A reaction vessel automatic loading device, comprising:
a feed compartment configured to store a reaction vessel;
a pickup mechanism configured to pick up the reaction vessel in the feed compartment;
a control unit configured to control a motion of the pickup mechanism; and
a transport mechanism, the transport mechanism comprising at least one reaction vessel station configured to store the reaction vessel that drops from the pickup mechanism, so as to store and transport the reaction vessel,
wherein the transport mechanism further comprises a mounting base, a rotating tray, and a transport electric motor, the rotating tray has at least one reaction vessel station, one side of the reaction vessel station is provided with an opening to form an internal vessel inlet, the rotating tray is mounted on the transport electric motor, and the control unit is connected to the transport electric motor and is further configured to control a rotation of the transport electric motor; the rotating tray is rotatably disposed in the mounting base, one side of the mounting base is provided with an opening to form an outer vessel inlet, and the internal vessel inlet is disposed on one side of the rotating tray, near the mounting base; the rotating tray rotates to align the internal vessel inlet with the outer vessel inlet, so as to allow the reaction vessel to enter the reaction vessel station.

16. The reaction vessel automatic loading device of claim 15, wherein after an out-of-step signal for the transport electric motor is detected, the control unit drives the transport electric motor to rotate backward by a preset distance and then rotate forward, at a same period of time the control unit controls the transport electric motor to start to find a zero position as the transport electric motor rotates forward; after a signal indicating that the zero position is found is received, the control unit controls the transport electric motor to normally rotate, or after a signal indicating that the zero position fails to be found is received, the control unit controls the transport electric motor to stop operation and sends prompt information.

17. A loading method for a reaction vessel automatic loading device, wherein the reaction vessel automatic loading device comprises a plurality of pickup blocks, the loading method comprising:
placing a reaction vessel on one of the pickup blocks;
moving the reaction vessel carried by the pickup block for a first preset period of time or by a preset distance, and then pausing or shaking the pickup block to enable the reaction vessel to drop from the pickup block, and
receiving the reaction vessel that drops from the pickup block so as to allow the reaction vessel to slide on a track disposed obliquely downward,
wherein the reaction vessel slides downward on the track to a temporary storage area for sequentially arranged storage in a non-free drop state with a bottom of the reaction vessel turning toward a start point of the track, or the reaction vessel slides downward on the track in a non-free drop state by a preset distance and then in a free drop state to the temporary storage area.

18. The loading method of claim 17, wherein moving the reaction vessel carried by the pickup block for a first preset period of time or by a preset distance, and then pausing or shaking the pickup block to enable the reaction vessel to drop from the pickup block, comprises:
driving the pickup block by a driving structure to pause or shake to enable the reaction vessel to drop from a reaction vessel exit of the pickup block; or
shaking, by a shaking mechanism, the pickup block, when the pickup block moves to an unloading position, to enable the reaction vessel to drop from a reaction vessel exit of the pickup block.

19. A loading method for a reaction vessel automatic loading device, wherein the reaction vessel automatic loading device comprises a plurality of pickup blocks, the loading method comprising:
placing a reaction vessel on one of the pickup blocks;
moving the reaction vessel carried by the pickup block for a first preset period of time or by a preset distance, and then pausing or shaking the pickup block to enable the reaction vessel to drop from the pickup block, and
detecting whether reaction vessels in a temporary storage area are arranged to designated positions or whether a quantity of reaction vessels in a temporary storage area reaches a preset quantity; and when a detection result is positive, sending prompt or alarm information to a user, or stopping loading reaction vessels; or
detecting whether the reaction vessel enters a temporary storage area within a preset period of time; and when a detection result is negative, sending prompt or alarm information indicating a lack of reaction vessels to a user, or stopping loading reaction vessels if it has not already been stopped.

20. A loading method for a reaction vessel automatic loading device, wherein the reaction vessel automatic loading device comprises a plurality of pickup blocks, the loading method comprising:

placing a reaction vessel on one of the pickup blocks; and moving the reaction vessel carried by the pickup block for a first preset period of time or by a preset distance, and then pausing or shaking the pickup block to enable the reaction vessel to drop from the pickup block, wherein moving the reaction vessel carried by the pickup block for a first preset period of time or by a preset distance, and then pausing or shaking the pickup block to enable the reaction vessel to drop from the pickup block, comprises: moving the pickup block in a cyclic motion; within one cycle of motion, first moving the pickup block for the first preset period of time or by the preset distance and then pausing or shaking for a second preset period of time; wherein shaking for the second preset period of time comprises at least one of: making the pickup block separately move backward and forward at least once within the second preset period of time; making the pickup block move backward by a distance within the second preset period of time; and making the pickup block intermittently move forward or backward by at least two distances within the second preset period of time.

* * * * *